UNITED STATES PATENT OFFICE 2,237,822

CONVERSION OF HYDROCARBONS

Edwin T. Layng, Jersey City, N. J., assignor to The Polymerization Process Corporation, Jersey City, N. J., a corporation of Delaware No Drawing. Application November 9, 1939, Serial No. 303,541

6 Claims. (Cl. 196—10)

This invention relates to the conversion of olefinic hydrocarbons to hydrocarbons of higher boiling points. More particularly, the invention relates to a process for the conversion of low-boiling normally gaseous and normally liquid hydrocarbons to hydrocarbons within the motor-fuel boiling range.

It has been suggested previously to effect polymerization of olefinic hydrocarbons under suitable conditions by means of various catalytic materials.

In connection with the present invention it has been discovered that acid pyrophosphates of certain metals are highly effective as catalytic contact agents for promoting the polymerization of olefinic hydrocarbons. These acid pyrophosphates are: $CuH_2P_2O_7$, $HgH_2P_2O_7$, $ZnH_2P_2O_7$, $MgH_2P_2O_7$, $Fe_2H_6(P_2O_7)_3$, $Al_2H_6(P_2O_7)_3$ and $CoH_2P_2O_7$.

In carrying out the invention the olefinic hydrocarbons, or hydrocarbons containing olefinic constituents, are passed in contact with the catalytic contact agent in a suitable reactor, the hydrocarbons being preheated suitably for the reaction. Any suitable pressure may be used, but it is preferable to employ relatively high pressures, for example in excess of 150 pounds per square inch. Since the rate of polymerization is a function of the concentration of the olefins such reactions are best operated at superatmospheric pressure.

The operating temperature will depend somewhat upon the nature of the material under treatment and the product desired. For example, for the conversion of gaseous olefins, such as butylenes, a temperature of approximately 300° to 400° F. is advantageous for effecting maximum conversion to gasoline constituents. Generally, temperatures within the range of 250° to 500° F. will be found to be advantageous for the conversion of low-boiling olefinic hydrocarbons to gasoline constituents.

The extent of reaction and the character of the liquid product are affected by the length of reaction time as well as by the reaction temperature and pressure. In general for the conversion of low-boiling olefinic hydrocarbons the charge to the operation should be passed over the catalytic contact agent at a rate of 2 to 50 or more cubic feet of charge, (measured as gas at standard conditions of temperature and pressure) per pound of catalytic contact material per hour.

It is apparent that with any given charge the extent of reaction and the character of the product depend mainly upon the operating pressure, the operating temperature and the space velocity of the charge. Many combinations of these variables may be used in obtaining the desired amount and quality of production, but by reference to the following general description and specific example it will be possible to select weight conditions and produce a desired result without undue experimentation.

The metal acid pyrophosphates employed in the present invention may be prepared advantageously by the reaction of a soluble salt of the desired metal with a soluble metal acid pyrophosphate such as $Na_2H_2P_2O_7$. In the following description of the preparation of the metal acid pyrophosphates reference will be had to the use of sodium acid pyrophosphate or secondary sodium pyrophosphate, by way of example. It will be understood, however, that other soluble acid pyrophosphates such as that of potassium are equally valuable for the purpose.

Secondary sodium pyrophosphate or dihydrogen sodium pyrophosphate may be prepared by any suitable method such as by the controlled dehydration of sodium dihydrogen orthophosphate, or, preferably, by reacting equal molar amounts of sodium pyrophosphate and sulphuric acid in the following manner:

$$Na_4P_2O_7 + H_2SO_4 = Na_2H_2P_2O_7 + Na_2SO_4$$

The sodium dihydrogen pyrophosphate then can be mixed with a solution of a soluble salt of the desired metal such as copper sulphate to give the desired product in accordance with the following reaction:

$$Na_2H_2P_2O_7 + CuSO_4 = CuH_2P_2O_7 + Na_2SO_4$$

The preparation may be effected advantageously by forming a solution of the sodium pyrophosphate in sulphuric acid and then adding the resulting solution to the metal salt solution. The following example illustrates this method of preparation. A solution of copper sulphate was formed by dissolving 62.5 grams of $CuSO_4.5H_2O$ in 1375 cc. of water. A solution of sodium pyrophosphate was formed by dissolving 111.5 grams of $Na_4P_2O_7.10H_2O$ in 2500 cc. of water. To the latter solution was added 14 cc. of sulphuric acid (94%). After thorough mixing the sodium pyrophosphate-sulphuric acid solution was poured rapidly into the copper sulphate solution and the whole stirred rapidly. Upon continued stirring a light blue crystalline precipitate was formed. The mixture was then filtered and the filter cake washed several times by stirring each time with distilled water and refiltering. The washed filter cake was then dried at 230° F. for 24 hours and pelleted into ⅛ inch pellets.

The foregoing discussion of the preparation of the catalytic contact material refers, for example only, to the use of copper sulphate for the production of a copper dihydrogen pyrophosphate catalytic contact material. It will be understood, however, that the foregoing discussion and directions apply equally well to the use of other soluble salts of copper and to the use of soluble salts of the metals of the other acid pyrophosphates listed above in the preparation of the various active metal acid pyrophosphates.

For an example of the use of catalytic contact material thus prepared under specific operating conditions the results obtained from an operation on a butane-butene gas mixture containing 27% normal butene and 10% isobutene may be referred to. In this operation the gas was passed over catalytic contact material consisting of copper dihydrogen pyrophosphate at a rate of 33 to 37 cubic feet, (measured as gas at standard conditions of temperature and pressure), per pound of catalytic contact material per hour. A pressure of 1400 pounds per square inch was maintained on the reactor, and the reactor was brought rapidly to an operating temperature of 400° F. In a test period of over 100 hours duration the liquid polymer yield was approximately 23.2% by weight based on the charge, representing a 62% conversion of the olefins charged.

If more complete conversion of the olefins had been desired in connection with the operation described above this could have been accomplished by changing one or more of the variables of temperature, pressure and space velocity discussed previously. For example, it could have been accomplished conveniently by raising the operating temperature slightly, for example, to 450° F. or by reducing the space velocity slightly or by means of both variations.

As mentioned above, the extent of conversion is effected by the variables of temperature, pressure and space velocity. The character of the liquid product is effected also by these variables in respect to its boiling point and, in the case of gasoline, in respect to its octane number. For example, it may be desirable to limit the extent of conversion obtained in order to obtain a gasoline product of relatively high octane number. The effect of the extent of conversion in the octane number is particularly noticeable in connection with the treatment of gaseous mixtures containing both normal butenes and isobutenes. For example, in the treatment of a mixture of normal and isobutenes at a temperature such as that mentioned above it is found that conversion of the isobutene proceeds more rapidly than conversion of the normal butene so that by limiting the time of contact of the charge with the catalytic contact material it is possible to effect preferential conversion of the isobutene and thus obtain a production of relatively high octane number.

While the foregoing example refers to the treatment of a gas containing as the olefinic constituents only normal and isobutenes, it is quite apparent that the process is equally applicable to the treatment of other olefins. For example, a gaseous mixture containing propylene in substantial proportions as well as butenes may be treated with equal facility; or a gas comprising propylene as its principal olefinic constituent may be treated as well. In the treatment of gaseous mixtures including substantial proportions of propylene it may be desirable in order to effect substantial conversion of propylene to employ a somewhat higher temperature and a somewhat lower feed rate than the above example. For example, in the treatment of a propane-propylene gas containing 30% of propylene a feed rate of 10 cubic feet measured as gas at standard conditions of temperature and pressure per pound of catalyst per hour and a temperature of 400° to 500° F. are found to be advantageous.

I claim:

1. The method of converting olefinic hydrocarbons to hydrocarbons of higher boiling points by polymerization thereof which comprises contacting said olefinic hydrocarbons at elevated temperature with a catalytic contact agent comprising as an essential ingredient an acid metal pyrophosphate selected from the group consisting of $CuH_2P_2O_7$, $HgH_2P_2O_7$, $ZnH_2P_2O_7$, $MgH_2P_2O_7$, $Fe_2H_6(P_2O_7)_3$, $Al_2H_6(P_2O_7)_3$ and $CoH_2P_2O_7$.

2. The method of claim 1 wherein copper dihydrogen pyrophosphate is employed as said metal acid pyrophosphate.

3. The method of treating a mixture of hydrocarbons comprising both normal olefins and iso-olefins to effect conversion of a portion thereof to hydrocarbons of higher boiling points within the gasoline boiling range by polymerization thereof which comprises contacting said mixture of hydrocarbons at elevated temperature with a catalytic contact agent comprising as an essential ingredient a metal acid pyrophosphate selected from the group consisting of $CuH_2P_2O_7$, $HgH_2P_2O_7$, $ZnH_2P_2O_7$, $MgH_2P_2O_7$, $Fe_2H_6(P_2O_7)_3$, $Al_2H_6(P_2O_7)_3$ and $CoH_2P_2O_7$, and limiting the extent of conversion of said hydrocarbons to higher boiling products to obtain a gasoline product of relatively high octane number.

4. The method of claim 3 wherein said mixture of hydrocarbons comprises normal butenes and isobutene.

5. The method of claim 3 wherein copper dihydrogen pyrophosphate is employed as said metal acid pyrophosphate.

6. The method of converting olefinic hydrocarbons to hydrocarbons of higher boiling points which comprises contacting said olefinic hydrocarbons with a metal acid pyrophosphate selected from the group consisting of $CuH_2P_2O_7$, $HgH_2P_2O_7$, $ZnH_2P_2O_7$, $MgH_2P_2O_7$, $Fe_2H_6(P_2O_7)_3$, $Al_2H_6(P_2O_7)_3$ and $CoH_2P_2O_7$ under conditions of temperature, pressure and time suitable to effect said conversion.

EDWIN T. LAYNG.